United States Patent
El Majdoubi

(10) Patent No.: US 12,445,310 B2
(45) Date of Patent: Oct. 14, 2025

(54) SYSTEMS AND METHODS FOR BLOCKCHAIN-ENABLED END-TO-END ENCRYPTION IN INSTANT MESSAGING APPLICATIONS

(71) Applicant: Driss El Majdoubi, Rabat (MA)

(72) Inventor: Driss El Majdoubi, Rabat (MA)

( * ) Notice: Subject to any disclaimer, the term of this patent is extended or adjusted under 35 U.S.C. 154(b) by 0 days.

(21) Appl. No.: 18/778,287

(22) Filed: Jul. 19, 2024

(65) Prior Publication Data

US 2025/0300841 A1    Sep. 25, 2025

Related U.S. Application Data

(62) Division of application No. 18/610,733, filed on Mar. 20, 2024, now Pat. No. 12,341,910.

(51) Int. Cl.
*H04L 9/32* (2006.01)
*H04L 9/14* (2006.01)

(52) U.S. Cl.
CPC .............. *H04L 9/3263* (2013.01); *H04L 9/14* (2013.01)

(58) Field of Classification Search
None
See application file for complete search history.

(56) References Cited

U.S. PATENT DOCUMENTS

| | | | | |
|---|---|---|---|---|
| 2018/0295137 | A1* | 10/2018 | Zager | H04L 63/0861 |
| 2022/0272085 | A1* | 8/2022 | Novotny | G06F 16/2379 |
| 2022/0329570 | A1* | 10/2022 | Sharma | H04L 63/04 |
| 2022/0393891 | A1* | 12/2022 | Mackcay | H04L 9/50 |
| 2024/0217374 | A1* | 7/2024 | Yeo | B60L 53/68 |

FOREIGN PATENT DOCUMENTS

CN    115660836 A    1/2023

OTHER PUBLICATIONS

Nguyen, T.H.L. and Nguyen, T.T.H., Dec. 2008, An approach to protect private key using fingerprint biometric encryption key in BioPKI based security system. In 2008 10th International Conference on Control, Automation, Robotics and Vision (pp. 1595-1599). IEEE. (Year: 2008).*

Kara, M., Laouid, A. and Hammoudeh, M., 2023. An efficient multi-signature scheme for blockchain. Cryptology ePrint Archive. (Year: 2023).*

(Continued)

*Primary Examiner* — Luu T Pham
*Assistant Examiner* — Edward X Long
(74) *Attorney, Agent, or Firm* — Foley & Lardner LLP

(57) ABSTRACT

A system is provided to leverage blockchain for a Multi-Signed Certificate-To-Identity (MSC-To-IT) system using a distributed approach to allow end users to have greater control over their digital identities and cryptographic keys. The system can manage cryptographic keys in a distributed network. The system can include a plurality of nodes configured to participate in a blockchain network. The system can include a key generation module, operable on at least one of the nodes, to distribute generation of cryptographic keys using a threshold scheme, where the cryptographic keys can include a public key and a private key share for each participating node.

8 Claims, 5 Drawing Sheets

(56) References Cited

OTHER PUBLICATIONS

Srivastava, V., Debnath, S.K., Bera, B., Das, A.K., Park, Y. and Lorenz, P., 2022. Blockchain-envisioned provably secure multivariate identity-based multi-signature scheme for Internet of Vehicles environment. IEEE Transactions on Vehicular Technology, 71(9), pp. 9853-9867. (Year: 2022).*

Singh et al., "Blockchain-enabled End-to End Encryption for Instant Messaging Applications," 2022 IEEE 23rd International Symposium on a World of Wireless Mobile and Multimedia Networks, IEEE, Jun. 14, 2022, 501-506.

Wang et al., "Certification with Multiple Signatures," Proceedings of the 4th Annual ACM Conference on Research in Information Technology pp. 13-18, https://doi.org/10.1145/2808062.2808068, Sep. 29, 2015, 13-18—Abstract only.

* cited by examiner

SYSTEMS AND METHODS FOR BLOCKCHAIN-ENABLED END-TO-END ENCRYPTION IN INSTANT MESSAGING APPLICATIONS

CROSS-REFERENCE TO RELATED APPLICATIONS

This application is a Divisional of U.S. application Ser. No. 18/610,733, filed Mar. 20, 2024, the entire contents of which are incorporated herein by reference.

BACKGROUND

The present invention relates generally to the field of cryptographic key management within distributed networks.

SUMMARY OF THE INVENTION

One embodiment of the invention relates to a system for managing cryptographic keys in a distributed network. The system may comprise a plurality of nodes configured to participate in a blockchain network. The system may comprise a key generation module, operable on at least one of the nodes, to distribute generation of cryptographic keys using a threshold scheme, wherein the cryptographic keys can include a public key and a private key share for each participating node. A verification module, operable on at least one of the nodes, can be configured to validate an integrity and authenticity of the cryptographic key shares exchanged among the nodes using the blockchain network. The system can include a key reconstruction module configured to enable the reconstruction of a private key from a subset of the private key shares when a predetermined threshold number of shares is reached, wherein the private key can be used for decrypting encrypted messages or data transmitted within the network. A secure communication module can be configured to establish secure communication channels between nodes using the cryptographic keys generated by the key generation module. The system can include a storage module configured to store the cryptographic key shares and the public key within the blockchain network.

Another embodiment is a system for facilitating secure communication between users within a blockchain network, comprising a Multi-Signed Certificate Provider (MSCP) configured to generate and furnish multi-signed certificates for users' public keys, including an identity key, a one-time key, and a fingerprint key, and to register said certificates on the blockchain network; a blockchain network configured to store the multi-signed certificates, which may be useful for ensuring the integrity and authenticity of these certificates for verification purposes; a smart contract deployed on the blockchain network, configured to manage the registration, retrieval, and verification of multi-signed certificates for establishing secure communication channels between users; an instant messaging server associated with the MSCP, configured to facilitate message delivery by notifying users of incoming messages and ensuring prompt relay of messages; and a user device equipped with a cryptographic module, configured to generate public and private keys, encrypt and decrypt messages using the secure communication channel established based on verified multi-signed certificates from the blockchain network.

DETAILED DESCRIPTION

Figure 1:
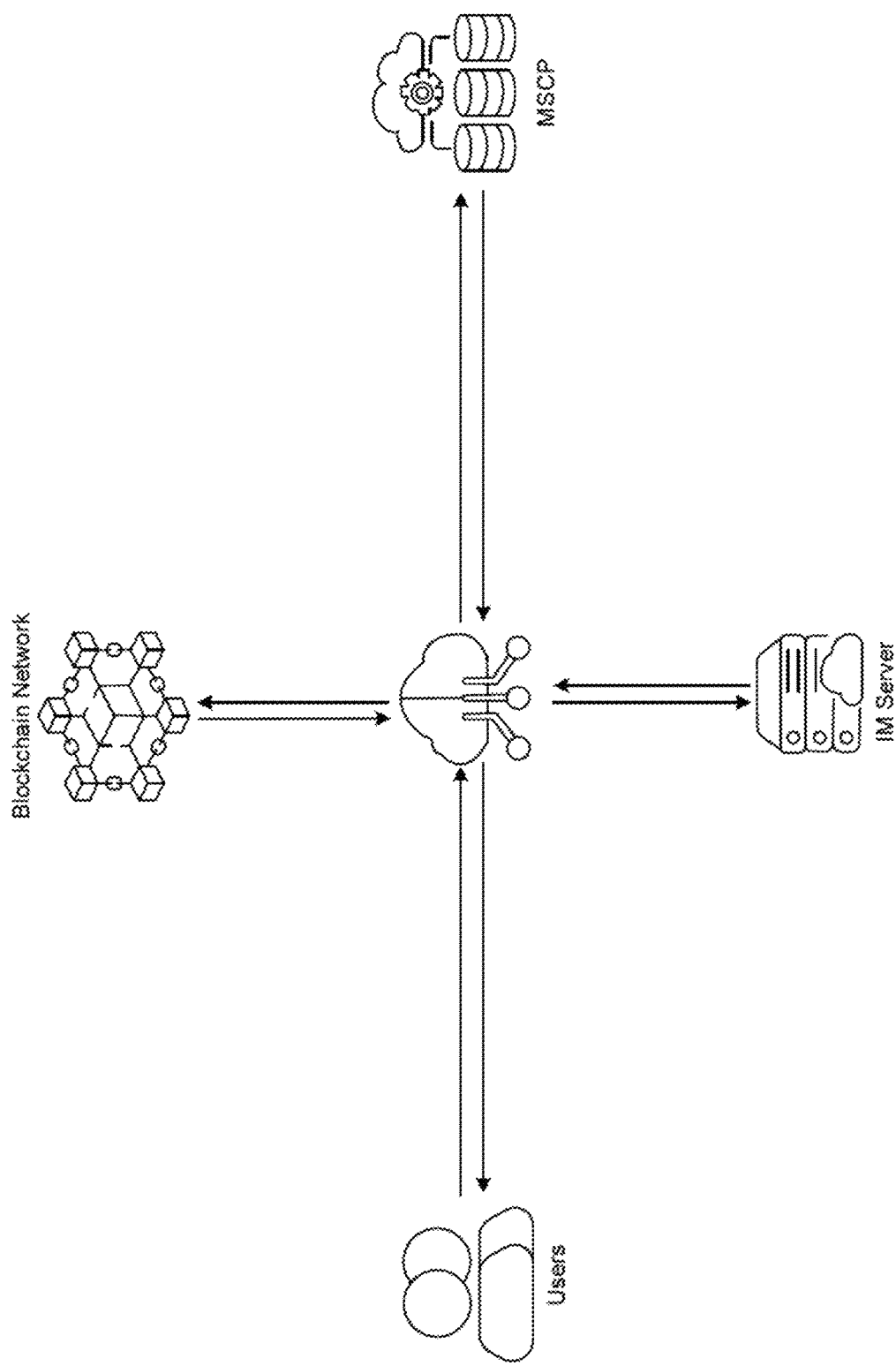
FIG. 1 illustrates an example topology model, in accordance with some embodiments of the present disclosure.

In the digital age, End-to-End Encryption (E2EE) has emerged as a fundamental technology for securing the confidentiality and privacy of digital communications. E2EE ensures that the content of messages can be accessed by the intended recipients, mitigating the risks associated with eavesdropping, data breaches, and unauthorized surveillance. With the proliferation of digital communication platforms and the exchange of sensitive information across the globe, the need for robust security mechanisms to protect data integrity, confidentiality, and authenticity has never been more pressing. The adoption of E2EE by major messaging applications like Facebook, WhatsApp, and Signal, combined with concerns over privacy in the wake of revelations about mass surveillance, has underscored the vital role of E2EE in safeguarding individual and collective digital interactions. This technology represents a critical shift towards user empowerment and control over their personal data, making it increasingly important in today's modern communication systems.

End-to-End Encryption (E2EE) protocols encompass several core phases to ensure comprehensive security in digital communication.

Message Authentication and Integrity: Beyond encryption, E2EE protocols integrate mechanisms to authenticate and maintain the integrity of messages. This safeguards against tampering during transit and confirms the message's origin. Methods like digital signatures or message authentication codes (MACs) serve this purpose.

Key Exchange: The initial phase centers on secure key exchange methods, such as Diffie-Hellman or Public Key Infrastructure (PKI), to facilitate message encryption and decryption while safeguarding key confidentiality.

Encryption and Decryption: In the subsequent phase, messages or data can be encrypted using the recipient's public key for secure transmission, rendering content unreadable to unauthorized parties. The recipient uses their private key for decryption, ensuring message confidentiality.

Backward/forward Encryption Mechanism: In this context, "forward encryption" ensures that the intended recipient can decrypt and read the messages, while "backward encryption" allows the sender to decrypt and review their previously sent messages. These mechanisms combine security and convenience within E2EE systems.

Secure Backup: This phase ensures the secure backup and restoration of user data, including encryption keys and sensitive content. It entails encrypting and securely storing these backups to prevent unauthorized access or data loss, enabling users to recover their data in case of device loss or failure.

End-to-End Encryption (E2EE) can rely on a range of sophisticated techniques to ensure the security and privacy of digital communications. Three commonly used methods that have gained prominence in E2EE protocols can be the Diffie-Hellman key exchange, the Double Ratchet algorithm, and the X3DH (Extended Triple Diffie-Hellman) protocol. Diffie-Hellman serves as the cornerstone of secure key exchange, enabling parties to establish a shared secret over public channels while keeping it confidential from eavesdroppers. The Double Ratchet algorithm can be a critical component of secure messaging applications like Signal. It provides forward secrecy and cryptographic ratcheting, ensuring that even if an encryption key can be compromised, past and future messages remain secure. Lastly, the X3DH protocol combines elements of Diffie-Hellman with a pre-key distribution system, simplifying the process of securely exchanging keys and ensuring authenticity in the process. These techniques collectively provide a robust foundation for E2EE systems, delivering the essential attributes of confidentiality, integrity, and future secrecy, all of which can be crucial for secure digital communication in today's interconnected world.

The centralized nature of protocols introduces security vulnerabilities that merit consideration. One major concern can be the reliance on a central authority or key server, which serves as a single point of failure. Malicious actors targeting this central entity can compromise the entire system's security. Additionally, identity verification, a cornerstone of secure communication, becomes challenging in the era of increasing decentralization and pseudonymous online interactions. Attacks can include identity spoofing, denial of service, impersonation and man-in-the-middle attacks, potentially undermining the authenticity of communication channels.

As a result, the need for a trusted and decentralized Public Key Infrastructure (PKI) has emerged as an essential component of contemporary communication security. In a decentralized PKI, the traditional reliance on central certificate authorities can be minimized, reducing the risk associated with a single point of failure. A decentralized end-to-end encryption protocol can leverage the power of blockchain for a Multi-Signed Certificate-To-Identity (MSC-To-IT) system. This distributed approach allows end users to have greater control over their digital identities and cryptographic keys. Employing blockchain technology can enable the creation of tamper-resistant and auditable records for identity verification events. This can fortify the security of the identity verification process and instill transparency and accountability. Such a system enables end users to independently verify each other's identities, mitigating the risks of impersonation and man-in-the-middle attacks.

A decentralized end-to-end encryption protocol can be based on blockchain technology. The protocol can rely on cutting-edge technology such Ethereum Blockchain and smart contracts to enable decentralized identity storage, together with identity verification and client authentication techniques.

FIG. 1 illustrates an example topology model. The proposed decentralized end-to-end encryption protocol can consist of four key components depicted in FIG. 1.

Users: The users can be active participants who utilize the decentralized end-to-end encryption protocol for secure communication. Users initiate the communication process and can be responsible for encrypting and decrypting messages.

MSCP (Multi-Signed Certificate Provider): The MSCP entity acts as the certificate provider, responsible for generating and furnishing the multi-signed certificates. These certificates can be crucial for ensuring the authenticity and security of communication between users.

Instant Messaging Server: plays a vital role in the decentralized end-to-end encryption protocol. Its primary function can be to facilitate message delivery by notifying the intended recipient when a new message arrives. The server ensures that messages can be promptly relayed to users. Each instant messaging server can be relied to an MSCP.

Blockchain Network: Blockchain technology can be a central component of the decentralized end-to-end encryption protocol. It serves as the secure and tamper-resistant storage medium for multi-signed certificates. By storing certificates on the blockchain, the protocol ensures the integrity and authenticity of these certificates, making them accessible for verification when needed.

The architecture functions as a secure and decentralized ecosystem where users can communicate with one another while relying on multi-signed certificates stored in the blockchain. The MSCP entity acts as a trusted certificate provider, and the Instant Messaging Server ensures efficient message delivery. This architecture ensures the security and authenticity of communication while leveraging the strengths of blockchain technology.

The decentralized end-to-end encryption protocol can encompass seven primary mechanisms organized into three phases: Public key distribution, Encryption & decryption, and Identity verification and mutual authentication.

Public Key Distribution

Figure 2:
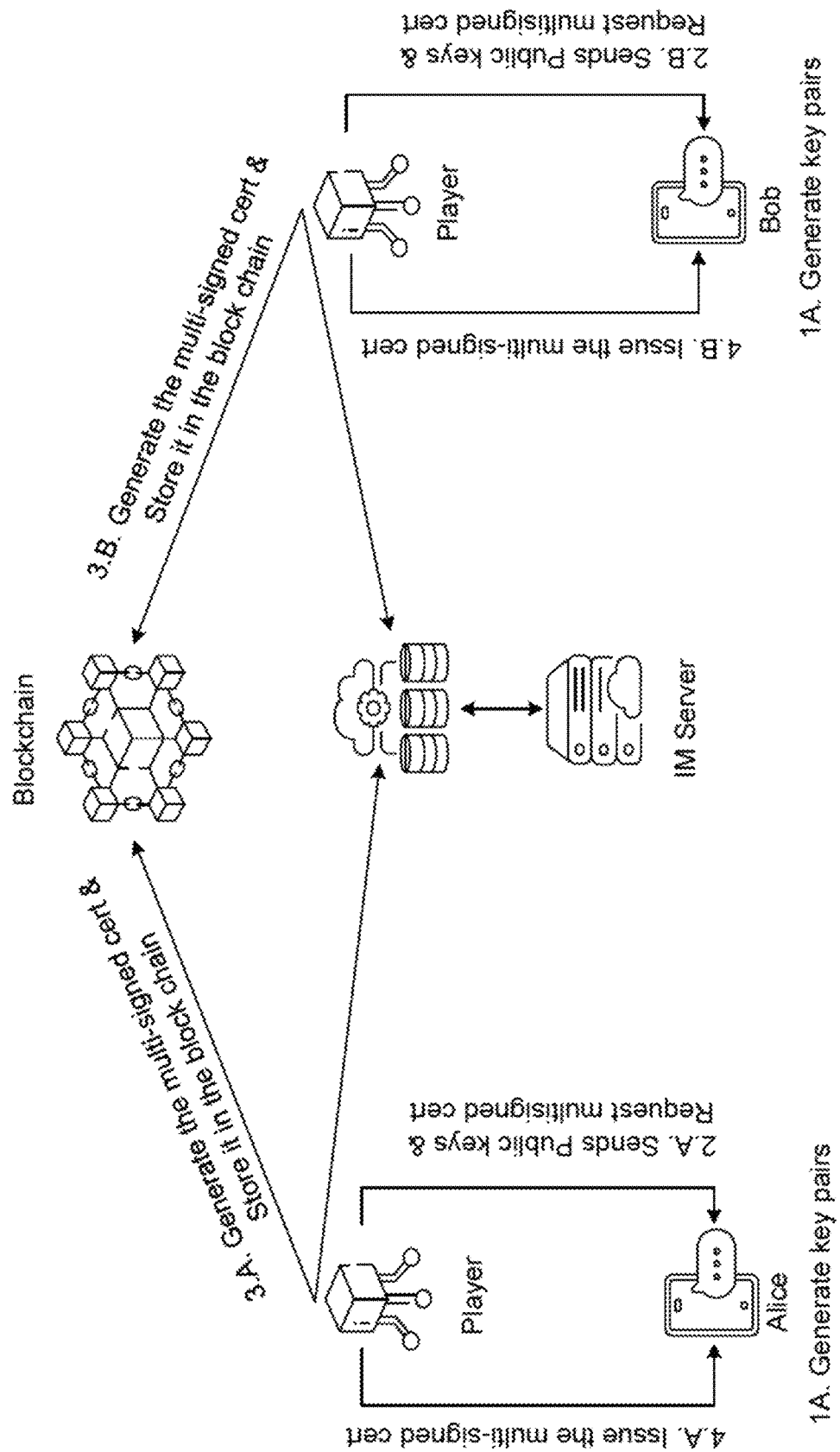
FIG. 2 illustrates an example of multi-signed certificate generation and blockchain registration, in accordance with some embodiments of the present disclosure.

To initiate the process, individuals need to register with the MSCP. A new user can establish an account by associating a digital certificate with it and utilizing the unique identity of the participant, as illustrated in FIG. 2.

Multi-Signed Certificate Generation and Blockchain Registration

In order to provide a secure E2EE, the decentralized end-to-end encryption protocol can combine a number of cryptographic techniques, to create a unique AES secret key for every conversation. Categories of public keys can include Identity Key (refer to as $I^i$): A Curve25519 key pair generated for long-term use.

One-Time Keys (refer to as $E^i$): A queue of Curve25519 key pairs for one-time usage.

Fingerprint Key (refer to as $F^i$): A Ed25519 key pair used for signing the two other keys.

Firstly, the user (A) generates two pairs of public and private keys: identity key ($I_{pub}^A, I_{pri}^A$), fingerprint key ($F_{pub}^A, F_{pri}^A$), and a pair of one-time keys ($E_{pub}^A, E_{pri}^A$). Subsequently, (A) sends a registration request to MSCP, including the user ID $ID^A$, the public components of these keys, the timestamp T, the keys' validity t, the signature of each key using the fingerprint key, and the signature of the entire request. The request can be transmitted via HTTPS.

Upon receiving the request, the MSCP entity validates the signature, then generates certificates for the identity keys and fingerprint ($C_{IF}^A$) key, along with a certificate for each one-time key ($C_n^A$). In fact, ($C_{IF}^A$) contains the ID of A, the timestamp, the key's validity, the two keys and their signature, and the decentralized end-to-end encryption protocol multi-signature. Moreover, ($C_n^A$) contains the ID of A, the timestamp, the key's validity, the key and its signature, and the decentralized end-to-end encryption protocol multi-signature.

To multi-sign the certificates, MSCP uses the private keys of 2/3 of nodes. The node invokes smart contract functions (AddIdentityCert and AddOneTimeCert) for adding the certificates to the blockchain. Then the MSCP generates a response that includes those certificates and its own certificate, signs the request, and sends it to user A through https.

Finally, the user validates the signature and stores his certificates. Now, user A has access to the system.

Certificate Fetching

When A intends to send a message to B, he invokes the smart contract functions (GetIdentityCert and GetOneTimeCert) by providing B's ID.

The smart contract responds by furnishing A with B's identity certificate ($C_{IF}^B$) and one of the one-time key certificates ($C_n^B$)

When receiving these certificates, A validates them and extracts the identity key ($I_{pub}^B$) and the one-time key ($E_{pub}^B$). These keys can be then utilized to generate a shared master Public Key Verification To enhance the security of the protocol, we propose an Identity Verification and Mutual Authentication (DIVMA) mechanism, enabling two users (A and B) to authenticate each other's cryptographic identity. This mechanism initiates when A acquires B's certificate ($C_B$) from the Smart Contract on the Blockchain (Bn). Using the public key ($K_{pub}^B$) recovered from the certificate ($C_B$) and assumed to be that of B, A executes the DIVMA-based mechanism to ensure the authenticity of this identity.

A sends a read request to the smart contract with B's ID ($ID^B$) to check if B can already be a user.

The smart contract verifies if ($C_{IF}^B$) exists on the Blockchain:
It performs a lookup of ($C_{IF}^B$).
It validates the request by returning the multi-signed certificate of Bob ($C_{IF}^B$).

A verifies the certificate and retrieves B's public key ($E_{pub}^B$) from it (assumed to be that of B).

A sends a transaction:

$$T_A^1 = [ID^A, ID^B, T, \text{Encrypt}_{pub^B}(ID^A, ID^B, T, E_{pub^A})]$$

Next, B checks the transaction with his private key ($E_{priv}^B$) and sends to A's address:

$$T_B^2 = [ID^A, ID^B, T+1, \text{Encrypt}_{pub^A}(ID^B, ID^A, T+1, E_{pub}^B)]$$

The same verification can be carried out after A receives the transaction ($\tau$), and mutual authentication can be created between the two users.

Sending a Secure Message

The shared master secret key can be created by A's messaging app using his private keys and B's public keys:

$$S = \text{ECDH}(I_{pri}^A, E_{pub}^B) \| \text{ECDH}(E_{pri}^A, I_{pub}^B) \| \text{ECDH}(E_{pri}^A, E_{pub}^B)$$

A hash-based key derivation function (HKDF) can be then used to construct a chain key:

$$R_0 \| R_0 = \text{HKDF}(0, S, \text{"OLM ROOT"}, 64)$$

from which a message key can be derived:

$$M_0 = \text{HMAC}(C_0, \text{"x01"})$$

User A encrypts the first message using the dynamic message key ($M_0$), leading to an update of the chain key ($C_i$). Following this, A generates a new chain key ($C_{i+1}$) and encrypts the subsequent message using the freshly created message key ($C_{i+1}$).

The system design integrates protection against forward disclosure using the ratchet forward mechanism, which modifies the chain key ($C_i$) for every incoming message. This ensures that even if a session key can be compromised, the remaining data in the system can remain secure. The compromise can be confined to the information secured by the stolen key, typically affecting only one message. Forward secrecy ensures that if the current key can be discovered, the attacker cannot access messages from prior or subsequent sessions.

Receiving a Secure Message

Once B receives the encrypted message, it proceeds by decrypting it. Hence, to decrypt this message, B invokes the smart contract functions (GetIdentityCert and) by providing A's ID. The smart contract returns ($C_{IF}^A$) and ($C_n^A$). B receives these certificates, validates them, and extracts the identity key ($I_{pub}^B$) and the one-time key ($E_{pub}^B$). Now, B generates the same shared master secret key S as A, leading to the same $M_0$. Subsequently, he decrypts the message.

Secure Backup

The decentralized end-to-end encryption protocol can introduce a unique approach where users generate their backup decryption key (K) through a familiar secret, such as a password. The backup data can be encrypted using the $M_i$ keys and stored on the user's instant messaging (IM) server, with $M_i$ of those messages additionally encrypted using the user-generated key (K).

Figure 3:
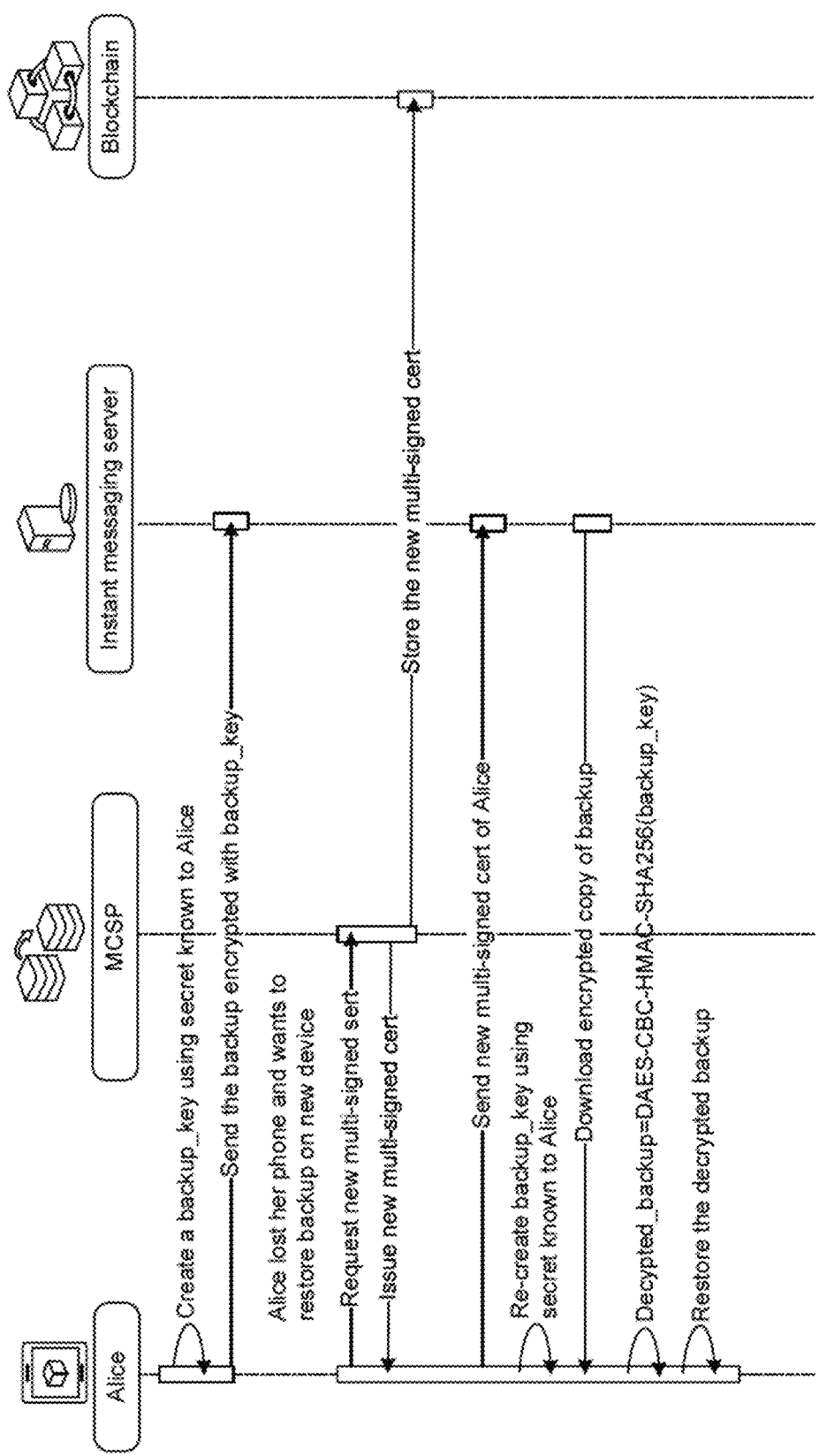
FIG. 3 depicts a sequence diagram illustrating the backup and restoration process in the protocol, in accordance with some embodiments of the present disclosure.

To retrieve their backups, users can access the IM server and decrypt the data using the K they established with a known secret, especially when transitioning between devices. FIG. 3 depicts the sequence diagram illustrating the backup and restoration process in the protocol.

A crypto-module can effectively encapsulate the intricacies of the E2EE protocol, offering a high level of abstraction that liberates developers to concentrate on their core application logic. By doing so, they can proceed with the confidence that the security and privacy standards provided by the E2EE solution can be robust and reliable. This strategic approach not only enriches the accessibility and usability of the protocol but also acts as a catalyst for its widespread adoption across a diverse array of messaging platforms.

The benefits of this user-friendly toolkit extend beyond convenience; they also serve as a catalyst for fostering more robust privacy protection within the digital communication landscape. As developers and organizations adopt the decentralized end-to-end encryption protocol more readily, users across the digital ecosystem can enjoy enhanced privacy and security while engaging in their online interactions. Consequently, the messaging landscape stands to become a safer and more secure space for individuals and businesses alike.

Figure 4:
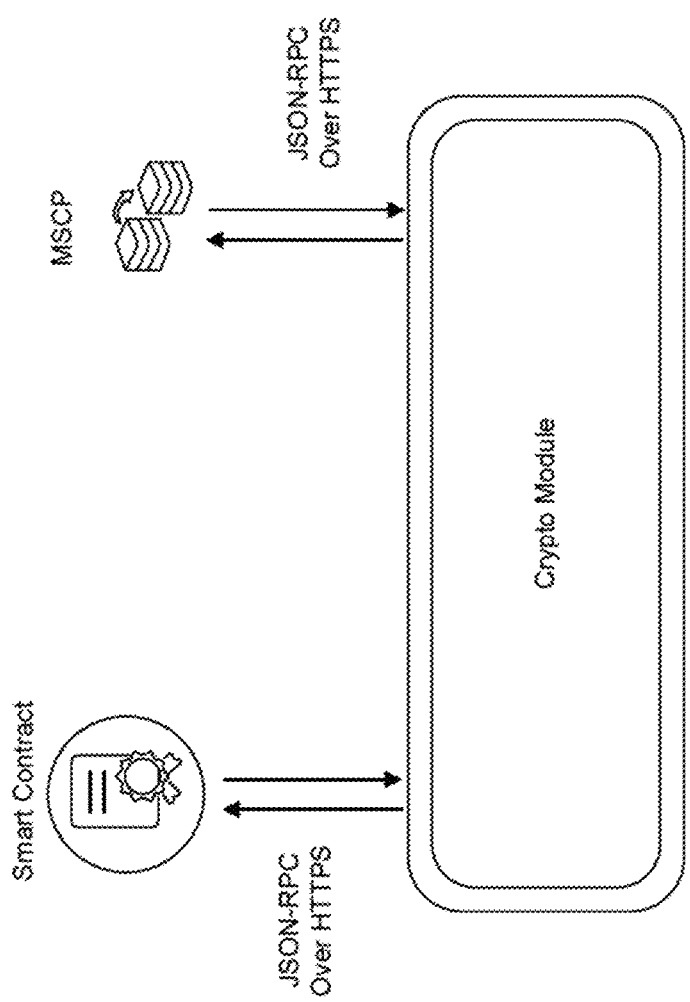
FIG. 4 depicts crypto-module architecture, in accordance with some embodiments of the present disclosure.

The crypto-module, whose architecture can be presented in FIG. 4, has a single object to interact with. The object can expose methods including:

Key Pairs Generation: The module generates cryptographic key pairs, consisting of a public key and a private key. The public key can be what gets certified and stored in the smart contract.

Certificate Generation: The module sends a request to the MSCP in order to create digital certificates for the generated public keys.

Certificate Retrieval by User: The crypto module includes a function that allows users to retrieve certificates stored in the smart contract.

Certificate Verification: This function allows users or applications to verify the authenticity and integrity of a certificate using the public key associated with it. The verification process typically involves checking the certificate's digital signature (if applicable) and confirming that the certificate has not been revoked.

Encryption: This function allows users to encrypt data using the recipient's certificate, ensuring that only the recipient with the corresponding can decrypt and access the information.

Decrypt: This function allows users to decrypt data that has been previously encrypted with their certificates. It transforms the ciphertext back into its original, human-readable format.

The blockchain can be employed to validate the exchanged key shares, adding an extra layer of security and transparency to the process. The verification mechanism for the secret key after its reconstruction ensures that the system maintains data integrity and that the key retrieval process can be reliable.

Furthermore, the system's use of bloom filters to select a subset of players for key generation can be a clever approach that optimizes the process and reduces overhead. Notably, the exact subgroup responsible for any particular key remains concealed, enhancing the protocol's security. Unlike alternative distributed key generation technologies such as distributed VSS (verifiable secret sharing), which necessitate the active participation and share exchange among all players.

The Shamir Secret Sharing scheme can be presented below.

Consider a set of $N>1$ players $P=\{Pi\}_{i \in} \{1, \ldots, N\}$. Assume that the player $P_j$ holds a secret and wants to distributively store it in form of shares among all the other parties so that none of them can have access to the secret unless a threshold $0 \leq t \leq N$ of parties agree to restore it.

In the beginning, all the players agree on a field $\mathbb{F}$, for example, a Galois Field $\mathbb{Z}/p\mathbb{Z}$ with a generator g such that p a large prime. The player then transforms, via a one to one mapping, the secret to an element $s \in \mathbb{F}$, and generates the coefficients of a polynomial $f \in \mathbb{F}[X]$ of degree t such that $f(0)=s$, and then computes the vector $(s_i)_{i \in \{1, \ldots, N\}}$, such that $s_i=f(i)$ for any $i \in \{1, \ldots, N\}$.

Afterwards, a collaboration between t+1 players at least can be required to recover the shared secret, which can be obtained through the Lagrangian interpolation. In other words, given any vector of shares $(s_i)_{i \in I}$, such that $I \subset \{1, \ldots, N\}$, and $|I|=t+1$, s can be obtained through:

$$s = f(0) = \sum_{i \in I} f(i) \prod_{j \in I-\{i\}} \frac{0-j}{i-j} = \sum_{i \in I} s_i \prod_{j \in I-\{i\}} \frac{j}{j-i}. \quad (1)$$

The Distributed Feldman Verifiable Secret Sharing (DF-VSS) can be presented below.

Assume that the players in P want to establish a pair of cryptographic keys: (1) a secret key $s \in \mathbb{Z}/p\mathbb{Z}$, that can be secretly shared between the players, which none of them can have access to unless a threshold of t players collaborate to restore it, and (2) a public key h such that $h=g^s \mod p$ which can be safely exposed to the public.

First, all the players agree on the same field, i.e. the prime p and the generator g. Then each player $P_i$ secretly generates t+1 coefficients $a_{i,0}, a_{i,1}, \ldots, a_{i,t}$ following a uniform distribution over $\mathbb{Z}/p\mathbb{Z}[X]$ using a cryptographic random number generator, and thus construct the following polynomial with degree t:

$$f_i = \sum_{k=0}^{t} a_{i,k} X^k \in \mathbb{Z}/p\mathbb{Z}[X], \quad (2)$$

and publicly broadcasts $A_{i,k}=g^{a_{i,k}} \mod p$ for $k \in \{1, \ldots, t\}$ to the players. Getting access to the secretly generated coefficients requires solving a discrete logarithm problem.

$P_i$ prepares the shares $s_{i,j}=f_i(j) \mod p$ for all $j \in 1, \ldots, N$, and sends the share $s_{i,j}$ to the player $P_j$ through a secure communication channel.

The player $P_j$ can verify the share received from any other player $P_i$ by checking if:

$$g^{s_{i,j}} = \prod_{k=0}^{t} (A_{i,k})^{j^k} \mod p. \quad (3)$$

If the condition can be not satisfied, $P_j$ broadcasts a complaint against $P_i$. If more than t players broadcast a complaint against a player $P_i$, it can be banned.

Let $Q \subset \{1, \ldots, N\}$ be the subset of qualified players indices. The public value can be computed by $h=\Pi_{i \in Q} A_{i,0} \mod p$.

For each $i \in Q$, the player $P_i$ computes the public verification values $A_k=\Pi_{i \in Q} A_{i,k} \mod p$ for all $k \in \{1, \ldots, t\}$, and his local share $s_i=\Sigma_{i \in Q} s_{j,i} \mod p$. The secret key can be $s=\Sigma_{i \in Q} a_{i,0} \mod p$, and it remains unknown to all the players from P.

The secret s can be the first coefficient of the polynomial $\psi$ equal to the sum of the qualified players polynomials in the field $\mathbb{Z}/p\mathbb{Z}[X]$, i.e.

$$s = \psi(0) = \sum_{i \in Q} f_i(0) \mod p. \quad (4)$$

Also, for any $i \in Q$:

$$s_i = \sum_{j \in Q} f_i(j) \mod p \quad (5)$$
$$= \psi(j) \mod p.$$

The construction of s requires the coordination of at least t+1 players form Q. For any subset $Q' \subset Q$ of t+1 elements, s can be obtained by $$s = \psi(0) = \sum_{i \in Q'} \psi(i) \prod_{j \in Q'-\{i\}} \frac{0-j}{i-j} \mod p \quad (6)$$
$$= \sum_{i \in Q'} s_i \prod_{j \in Q'-\{i\}} \frac{j}{j-i} \mod p.$$

The Diffie-Hellman Key Exchange can enable two parties to securely establish a shared secret key over an open communication channel, even in the presence of potential eavesdroppers.

The protocol similarly relies on the mathematical concept of modular exponentiation in a finite field, e.g. $\mathbb{Z}/p\mathbb{Z}$, and its security relies on the difficulty of the discrete logarithm problem.

Assume that two players $P_i$ and $P_j$ from P want to establish a secret communication channel by exchanging a secret key s. $P_i$ and $P_j$ respectively generate two secrets a and b from the field. $P_i$ computes $A=g^a \mod p$ and publicly sends it to $P_j$, similarly, $P_j$ computes $A=g^b \mod p$ and sends it to $P_i$.

Afterwards, both players independently compute the shared secret key s: $P_i$ computes $s=B^a \mod p$, and $P_j$ computes $s=A^a \mod p$.

The remarkable property of the Diffie-Hellman key exchange can be that both parties compute the same shared secret key s without directly exchanging it: notice that $A^b$ mod $p=g^{ab}$ mod $p=B^a$. s can then be used for secure communication, such as encrypting and decrypting messages using symmetric-key cryptography.

A Blockchain can be a distributed ledger across a peer-to-peer connected network of nodes identified by their public-private pair keys $\mathcal{N} =\{(sk_1, pk_1), (sk_2, pk_2), \ldots \}$. It can be seen as a sequence of blocks $(b_1, b_2, \ldots)$, where each block b consists of: (1) a set of transactions $t_i$, (2) a reference $h(b_{i-1})$ that points to the previous block by a hash function h to maintain the chain order and (3) a cryptographic nonce determined through a consensus mechanism.

The Blockchain satisfies the following properties. (1) Immutability: For each block $b_i$, its cryptographic hash $h(b_i)$ remains constant once computed, preventing retroactive modifications. (2) Consensus: There exists a consensus mechanism $\mathcal{C}$ that ensures agreement among nodes $\mathcal{N}$ on the validity and order of transactions in $t_i$. (3) Verification: For each transaction in $t_i$ send by a node (sk, pk), there exists a corresponding digital signature produced by sk, and verifiable with pk.

A Bloom filter can be a space-efficient probabilistic data structure particularly useful for membership testing, allowing a set of elements to be efficiently queried to determine if a specific element can be a member of the set.

Let $\Omega$ be a finite/countably finite set, an integer $m>0$, and a set of $K>0$ hash functions:

$$\mathcal{H} = \{h_i:\Omega \to \{1, \ldots, m\}\}_{i \in \{1, \ldots, K\}} \quad (7)$$

A Bloom filter can be defined with size $m>0$ and set of hash functions $\mathcal{H}$ as the map:

$$B_{\mathcal{H}}: \mathcal{P}(\Omega) \to \{0,1\}^m \, A \mapsto B\mathcal{H}(A) = [B\mathcal{H}(A)]_{i \in \{1, \ldots, m\}} \quad (8)$$

where $\mathcal{P}(\Omega)$ can be the power set of $\Omega$, and $[B\mathcal{H}(A)]_i$ can be the value of the bit at the i-th index in the array $B\mathcal{H}(A)$ for all $A \in \mathcal{P}(\Omega)$, that is:

$$[B_{\mathcal{H}}(A)]_i = \begin{cases} \max\{\delta_{i,h(w)}\} : \omega \in A, h \in \mathcal{H} & \text{if } A \neq \emptyset \\ 0 & \text{otherwise} \end{cases} \quad (9)$$

for all $i \in \{1, \ldots, m\}$.

Membership: Let $\omega \in \Omega$, $A \subset \Omega$ with $A \neq \emptyset$ and $B\mathcal{H}$ a Bloom filter with size m and set of hash function $\mathcal{H}$.

To test the membership of $\omega$ to A, the images of w can be computed by the hash functions in $\mathcal{H}$ and test whether the bits at the indices corresponding to these images can be all 1.

However, false positive matches can occur, i.e. the test may be positive for some elements of $\Omega$ on B(A) even if $\omega \notin A$, but false negative cannot, i.e. if the membership of an element $\omega \in \Omega$ can be negative on B(A), then $\omega \notin A$.

These two points can be summarized on the following theorem:

$$\text{For all } \omega \in \Omega, \omega \in A \Longrightarrow [B\mathcal{H}][(A)]_{h(w)}=1, \forall h \in \mathcal{H}. \quad \text{Lemma 1.}$$

Proof. If $\omega \in A$ and A can be not empty, then for all $h \in \mathcal{H}$ $$[B_{\mathcal{H}}(A)]_{h(w)} = \max\{\delta_{h(\omega),h'(\omega')} : \omega' \in A, h' \in \mathcal{H}\}$$
$$= \max(\{\delta_{h(\omega),h(\omega')}\} \cup \{\delta_{h(\omega),h'(\omega')} : \omega' \in A-\{\omega\}, h' \in \mathcal{H}-\{h\}\})$$
$$= \max(\{1\} \cup \{\delta_{h(\omega),h'(\omega')} : \omega' \in A-\{\omega\}, h' \in \mathcal{H}-\{h\}\})$$
$$= 1$$

since the values of the Kronecker deltas in the second set can be either 0 or 1.

Bloom filter of a union: A Bloom filter $B\mathcal{H}$ can be constructed with set of hash functions $\mathcal{H}$, of the union of two subsets A and B of $\Omega$ by performing the logical OR operation on the bits of the filters of the two sets.

$$\forall A, B \in \mathcal{P}(\Omega), \forall i \in \{1, \ldots, m\}, [B\mathcal{H}](A \cup B)]_i = [B\mathcal{H}(A)]_i \vee [B\mathcal{H}(B)]_i. \quad \text{Lemma 2.}$$

Proof. Let $A, B \in \mathcal{P}(\Omega)$,

If both sets can be empty, the result can be trivial.

If only one can be empty, for example B, for all $i \in \{1, \ldots, m\}$:

$$[B\mathcal{H}(A \cup B)]_i = [B\mathcal{H}(A)]_i \vee [B\mathcal{H}(B)]_i = [B\mathcal{H}(A)]_i \vee 0 = [B\mathcal{H}(A)]_i$$

which holds true since $A \cup B = A$ in this case.

Otherwise, after writing the rewriting the OR operation V of two bits as the the max of their values:

$$[B_{\mathcal{H}}(A)]_i \vee [B_{\mathcal{H}}(B)]_i = \max[B_{\mathcal{H}}(A)]_i, [B_{\mathcal{H}}(B)]_i$$
$$= \max(\max\{\delta_{i,h(\omega)} : \omega \in A, h \in \mathcal{H}\}, \max\{\delta_{i,h'\omega'} : \omega' \in B, h' \in \mathcal{H}\})$$
$$= \max(\{\delta_{i,h(\omega)} : \omega \in A, h \in \mathcal{H}\} \cup \{\delta_{i,h'\omega'} : \omega' \in B, h' \in \mathcal{H}\})$$
$$= \max(\{\delta_{i,h(\omega)} : \omega \in A \cup B, h \in \mathcal{H}\}$$
$$= [B_{\mathcal{H}}(A \cup B)]_i,$$

which terminates the proof.

Insertion of Elements to a Bloom Filter: The previous theorem gives a rule for (practical) construction of a Bloom filter of a nonempty set given its elements.

Corollary 1. A Bloom filter of size $m>0$ and set of hash functions $\mathcal{H}$ of a subset of $n>0$ elements $A=\{a_j\}_{j \in (1, \ldots, n)} \subset \Omega$ can be constructed by:

$$[B\mathcal{H}(A)]_i = [B\mathcal{H}(\{a_1\})]_i \vee \ldots \vee [B\mathcal{H}(\{a_1\})]_i,$$
$$\forall i \in \{1, \ldots, m\}. \quad (10)$$

Bloom Filter of an Intersection. Let A, B $\subset \Omega$, and B $\mathcal{H}$ a Bloom filter with size m>0 and set of hash functions $\mathcal{H}$. A Bloom filter to test the membership of an element $\omega \in \Omega$ to the intersection A∩B can be constructed by the logical AND operation on the bits of B $\mathcal{H}$ (A) and B $\mathcal{H}$ (B). Such filter can be denoted as follows: B $\mathcal{H}$ (A)∧B $\mathcal{H}$ (B)=([B $\mathcal{H}$ (A)]$_i$ ∧[B $\mathcal{H}$ (B)]$_i$)$_{i \in [1, \ldots, n]}$.

$$\forall \omega \in \Omega, \forall A, B \subset \Omega, \omega \in S \cap B \Rightarrow [B \mathcal{H}_{(A)} \wedge B \mathcal{H}_{(B)}]_{h[w]} = 1, \forall h \in \mathcal{H}.$$

Proof. Let $\omega \in \Omega$ and A, B $\subset \Omega$ be:

$$w \in A \cap B \Rightarrow [B_{\mathcal{H}}(A)]_{h(w)} = 1 \text{ and } [B_{\mathcal{H}}(B)]_{h(w)} = 1, \forall h \in \mathcal{H}$$

$$\Rightarrow [B_{\mathcal{H}}(A) \wedge B_{\mathcal{H}}(B)]_{h(w)} = 1, \forall h \in \mathcal{H}$$

which terminates the proof.

Corollary 2. Let $A_1, A_2, \ldots, A_n$ be a family of subsets of $\Omega$, for all $\omega \in \Omega$ $$w \in \bigcap_{i=1}^{n} A_i \Rightarrow [B_{\mathcal{H}}(A_1) \wedge \ldots \wedge B_{\mathcal{H}}(A_n)]_{h(w)} = 1, \forall h \in \mathcal{H}. \quad (11)$$

Preimage of a Bloom Filter: Let $\Omega$ be a universal set, $A \subset \Omega$? and B $\mathcal{H}$ a Bloom filter of size m>0 and a nonempty set of hash functions $\mathcal{H}$.

Let $\tilde{\mathcal{H}} \subset \mathcal{H}$ and $\tilde{K} = |\tilde{\mathcal{H}}|$.

Definition 2. The set can be called:

$$\{\omega \in \Omega : [B \mathcal{H}_{(A)}]_{h(w)} = 1 \forall h \in \tilde{\mathcal{H}} \} \quad (12)$$

the preimage of B $\mathcal{H}$ (A) under $\tilde{\mathcal{H}}$, and it can be denoted as $\langle B \mathcal{H} (A) \rangle \tilde{\mathcal{H}}$.

$$\forall A \subset \Omega, A \subset \langle B \mathcal{H}_{((A))} \rangle \tilde{\mathcal{H}}. \quad \text{Lemma 4.}$$

Proof. Easy! B $\mathcal{H}$ applying the proof of Lemma 1.

The previous property can be trivial but it clearly illustrates one of the fundamental properties of a Bloom filter, that is, the set of the elements with the positive membership test, given the array B $\mathcal{H}$ ((A), contains A, but it may be larger than it because of the presence of false positives, i.e. when $\langle B \mathcal{H} (A) \rangle \tilde{\mathcal{H}} - \{A\} \neq \emptyset$.

Another useful property in the formalism of the decentralized end-to-end encryption protocol can be derived from the previous lemma.

Corollary 3. For any family of n>0 subsets $A_1, \ldots, A_n \subset \Omega$:

$$\left| \bigcup_{i=1}^{n} A_i \right| \leq |\langle B_{\mathcal{H}}(A_1) \wedge \ldots \wedge B_{\mathcal{H}}(A_n) \rangle_{\mathcal{H}}| \quad (13)$$

In a dynamic scenario, end users can initiate a request to create a pair of public and private keys. The private key can serve to establish a secure communication channel between end users. The public key may remain accessible to any node.

In the dynamic version of the decentralized end-to-end encryption protocol, random keys can be generated during various sessions. These keys can be typically not employed directly for message encryption but rather to update a key derivation function. This function, in turn, generates a distinct key for each message within a specific session, ensuring both forward and backward secrecy. This mechanism can be inspired from the double ratchet algorithm. But in contrast to its traditional version the key derivation function updates through a Diffie-Hellman key exchange that necessitates trust in a server for communication, the decentralized end-to-end encryption protocol can use the secret key it generates. This approach can be notably less susceptible to man-in-the-middle attacks.

The decentralized end-to-end encryption protocol can consist of a set of active players denoted by $\mathcal{P} = \{P_i\}_{i \in (1, \ldots, N)}$. It can be assumed that the number of active players remains fixed, although it may vary over time and across different sessions.

Communication among the players occurs through two distinct channels. (1) A public communication channel: When a player broadcasts a message, it reaches all other players. (2) Secure communication channels: These channels exist between any two players, such as $P_i$ and $P_j$, and their security level can be determined by the cryptographic primitives upon which they can be built.

A Blockchain can be constructed across $\mathcal{P}$. It can be assumed that each participant, i.e. player $P_i \in \mathcal{P}$, can initiate a transaction involving a piece of data D, denoted as $T_{P_i}(D)$, through a predefined consensus mechanism. This transaction can be openly recorded on the Blockchain, and any node, not limited to the players, can have the ability to verify it.

The entities interacting with the decentralized end-to-end encryption protocol (e.g., the players and the end users) reach consensus on a large prime p and a generator g of a Galois field $\mathbb{Z}/p\mathbb{Z}$.

The players reach consensus on the size m of a Bloom filter and a set of K hash function $\mathcal{H} = \{h_1, h_2, \ldots, h_K\}$, s.t. for any $i \in \{1, \ldots, K\}$ $$h_i : \mathbb{Z}/p\mathbb{Z} \to \{1, \ldots, m\} \quad (14)$$

Each player can be identified by a unique ID, which can be universally known by any external entity, importantly the other players and end users. The identifier of a player $P_i$ can be any number form $\mathbb{Z}/p\mathbb{Z}$ under the constraint that p>N. For simplicity, each player $P_i \in \mathcal{P}$ can be identified by its index i in the set.

Any external user can request and build a secure communication channel with any player from $\mathcal{P}$. There exists another mechanism to assign a distinct and universally recognized identifier, denoted as $\text{Id}_{\mu_0}$, to each end user $\mu_0$. These identifiers can be known to all end users, allowing them to recognize each other.

The players agree on a hash function $\sigma^{(\cdot)}(\cdot)$ that map the indices (actual public identifiers) of the players to strictly ordered integers. Updates by a value $x \in \mathbb{Z}/p\mathbb{Z}$, it maps any input $y \in \{1, \ldots, n\}$ to produce an output $\sigma^{(x)}(y)$ in the same set, satisfying the requirements of a cryptographic hash function.

Consider an end user $\mu_0$ wanting to establish a shared secret key with a set of other end users $\{\mu_1, \mu_2, \ldots, \mu_n\}$ via decentralized end-to-end encryption protocol. $\mu_0$ sends a request to an honest player $P_{req} \in \mathcal{P}$ specifying the other users identifiers $\text{Id}_{\mu_1}, \text{Id}_{\mu_2}, \ldots, \text{Id}_{\mu_n}$, and a threshold t>0 of the desired least number of players required to reconstruct the key. The value of t can be chosen to balance between the required degree of security and the communication overhead.

The player creates a Blockchain transaction containing a generated identifier for the communication session t along with the identifiers of the users that can get the secret key through the decentralized end-to-end encryption protocol (e.g., $Id_{\mu_0}, Id_{\mu_1}, \ldots, Id_{\mu_n}$) and the threshold $\tau$. Therefore, the player creates $T_{P_{req}}((\tau, t, Id_{\mu_0}, Id_{\mu_1}, \ldots, Id_{\mu_n}))$.

Therefore the player broadcasts, using the public communication channel, a message requesting the other players the beginning of the key generation process for the session identified by $\tau$. The identity of the legitimate end users can be checked by the Blockchain transaction $T_{P_{req}}((\tau, t, Id_{\mu_0}, Id_{\mu_1}, \ldots, Id_{\mu_n}))$.

After receiving the key generation request message for a session $\tau$, each player $P_i \in \mathcal{P}$ (including the broadcaster $P_{req}$) extracts the requesting end users identifiers and the threshold $\tau$. These values can be verified from the transaction $T_{P_{req}}((\tau, t, Id_{\mu_0}, Id_{\mu_1}, Id_{\mu_n}, \ldots))$ and the public key of $P_{req}$. Afterwards, each player $P_i$ performs the following steps:

$P_i$ randomly generates, using a cryptographic random numbers generator, through a uniform distribution over the field $\mathbb{Z}/p\mathbb{Z}$, t+1 coefficients $a_{i,0}^{(\tau,0)}, a_{i,1}^{(\tau,0)} \ldots, a_{i,t}^{(\tau,0)}$ and prepares the polynomial:

$$f_i^{(\tau,0)} = \sum_{k=0}^{t} a_{i,k}^{(\tau,0)} X^k \in \mathbb{Z}/p\mathbb{Z}[X] \tag{15}$$

$P_i$ computes the values $s_{i,1}^{(\tau,0)}, s_{i,2}^{(\tau,0)}, \ldots, s_{i,N}^{(\tau,0)}$, such that for all $j \in \{1, \ldots, N\}$ $$s_{i,j}^{(\tau,0)} = f_i^{(\tau,0)}(j) \bmod p. \tag{16}$$

$P_i$ randomly chooses a subset of players' indices $V_i^{(\tau)} \subset \{1, \ldots, N\}$ such that:

$$|V_i^{(\tau)}| \geq \left\lceil \frac{N+1}{2} \right\rceil. \tag{17}$$

$P_i$ inserts the values corresponding to the chosen identifiers in a Bloom filter $b_i^{(\tau,0)}$ with size m and set of hash functions $\mathcal{H}$:

$$b_i^{(\tau)} = B_H(\{s_{i,1}^{(\tau,0)}\} j \in V_i^{(\tau,0)}). \tag{18}$$

$P_i$ computes the public values $A_{i,0}^{(\tau,0)}, \ldots, A_{i,t}^{(\tau,0)}$ such that for all $j \in \{1, \ldots, N\}$ $$A_{i,k}^{(\tau,0)} = g^{a_{i,k}^{(\tau,0)}} \bmod p. \tag{19}$$

$P_i$ creates a Blockchain transaction for the Bloom filter $T_{P_i}(b_i^{(\tau,0)})$ and another one for the public values $T_{P_i}(A_{k,1}^{(\tau,0)}, \ldots, A_{i,N}^{(\tau,0)})$.

$P_i$ secretly sends to each player $P_j \in P - \{P_i\}$, using the secure communication channel, the value $s_{i,j}^{(\tau,0)}$.

$P_i$ broadcasts using the public communication channel the values $A_{k,1}^{(\tau,0)}, \ldots, A_{i,N}^{(\tau,0)}$ and $b_i^{(\tau,0)}$.

After completing the previous steps, each player $P_i$ waits to receive the secret shares, the verification values, and the Bloom filters from the other players, and proceeds the following steps.

Each player $P_j \in P - \{P_i\}$, $P_i$, verifies the received values $A_{j,k}^{(\tau,0)}$, for all $k = \{1, \ldots, k\}$, through the Blockchain transaction $T_{P_i}(A_{k,1}^{(\tau,0)}, \ldots, A_{i,N}^{(\tau,0)})$, as well as the Bloom filter $b_j^{(\tau,0)}$ via $T_j(b_j^{(\tau,0)})$ $P_i$ verifies the received shares from each player $P_j \in P - \{P_i\}$ through:

$$g^{s_{i,k}^{(\tau,0)}} \bmod p = \prod_{k=1}^{N} (A_{i,k}^{(\tau,0)})^{j^k} \bmod p. \tag{20}$$

If the test fails, $P_i$ broadcasts a complaint message against $P_j$ to the other players.

The players wait for the reception of the complaint messages from the others, once received, each player $P_i$ proceeds the following, If $P_i$ received from the other players more than $$\frac{N+1}{2}$$

complaints against a player $P_j$, including its own, i.e. the majority complained against it, $P_i$ excludes it and proceeds the following steps.

It can be assumed that the set of non-disqualified players can be common among all the remaining players, $Q^{(\tau,0)}$ can denote the set of qualified players indices.

$P_i$ aggregates the Bloom filters of the qualified players by the logical AND operation to construct the participants Bloom filter $b_Q^{(\tau,0)}$ given by $$b_Q^{(\tau)} = \bigvee_{j \in Q^{(\tau,0)}} b_j^{(\tau)}. \tag{21}$$

$P_i$ computes the public value $h^{(\tau,0)}$ from the public values already prepared in step 4.3:

$$h^{(\tau,0)} = \prod_{k=1}^{N} A_{0,k}^{(\tau,0)} \bmod p. \tag{22}$$

$P_i$ prepares the one-way function $\sigma^{(h^{(\tau,0)})}$ and computes the indices $\sigma^{(h^{(\tau,0)})(j)}$ for every $j \in Q^{(\tau,0)}$. Then $P_i$ sorts these values into an array that can be denoted by $$T_{P_i}^{(\tau)} = \left(s_1^{(\tau)}, s_2^{(\tau)}, \ldots, s_{|Q^{(\tau,0)}|}^{(\tau)}\right) \tag{23}$$

An important property about the previously constructed array can be that it can be common among all the other players. The same function $\sigma^{(h^{(\tau,0)})}$ can be used in the construction of any players, and the set of qualified players $Q^{(\tau,0)}$ can be common as well, consequently:

$$T_{P_i}^{\tau} = T_{P_j}^{\tau} \forall i, j \in Q^{(\tau,0)} \tag{24}$$

It can be noted that the number of end users specified in the first key generation request can be less than half of the number of players. This assumption can be practically evident. In addition, the order at which these end users was specified in the first key generation request remains preserved and publicly known $\mu_0, \mu_1, \ldots, \mu_n$.

$P_i$ determines the indices of the players $j_1$ and $j_2$ such that:

$$\varsigma_1^{(\tau)} = \sigma^{(h^{(\tau,0)})}(j_1) \text{ and } \varsigma_1^{(\tau)} = \sigma^{(h^{(\tau,0)})}(j_2) \tag{25}$$

if the membership of both $S_{j_1,i}^{(\tau)}$ and $S_{j_2,i}^{(\tau)}$ of the Bloom filter $b_Q^{(\tau)}$ using the hash functions in $\mathcal{H}$ can be positive, then $P_i$ can be selected to be responsible to send the shares to $\mu_0$.

In other words, if the players $P_{j1}$ and $P_{j2}$ both voted on $P_i$, i.e. $i \in V_{j_1}^{(\tau)}$ and $i \in V_{j_2}^{(\tau)}$, then:

$$S_{i,j_1}^{(\tau)} \in \langle b_{j_1}^{(\tau)} \rangle_H \text{ and } S_{i,j_1}^{(\tau)} \in \langle b_{j_2}^{(\tau)} \rangle_H \tag{26}$$

and therefore by exploiting preimage and union properties of Bloom filters:

$$S_{i,j_1}^{(\tau)}, S_{i,j_2}^{(\tau)} \in \langle b_Q^{(\tau,0)} \rangle_H, \tag{27}$$

and thus both membership tests of $S_{i,j_1}^{(\tau)}$ and $S_{i,j_2}^{(\tau)}$ to $b_Q^{(\tau,0)}$ can be positive.

$P_i$ performs the same operation for the other users $\mu_1, \ldots, \mu_n$. More specifically, for each user $\mu_k$, the player determines the players indices $j_{k+1}$ and $j_{k+2}$ corresponding to $\varsigma_1^{(\tau)}$ and $\varsigma_1^{(\tau)}$ as above, and decides if it can be responsible for sending the local 1 1 shares to the user $\mu_k$ by testing the membership of $S_{j_{k+1},i}^{(\tau)}$ and $S_{j_{k+2},i}^{(\tau)}$ to $b_Q^{(\tau)}$ using the hash functions in $\mathcal{H}$.

As a result, $P_i$ determines the subset of users for whom it can be responsible to send the secret key shares for the communication channel identified by $\tau$. The set of their indices can be denoted by $$U_{P_i}^{(\tau)} = \left\{ k \in \{0, \ldots, n\} : S_{i,j_1}^{(\tau)}, S_{i,j_2}^{(\tau)} \in \langle b_Q^{(\tau,0)} \rangle_H \text{ s.t.} \left\{ \begin{array}{l} \sigma^{(h^{(\tau,0)})}(J_1) = \varsigma_{k+1}^{(\tau)} \\ \sigma^{(h^{(\tau,0)})}(J_{1S}) = \varsigma_{k+2}^{(\tau)} \end{array} \right. \right\} \tag{28}$$

$P_{\mu_k}^\tau$ the subset of players responsible for sending the secret shares to the user $\mu_k$ can be denoted by $k=0, \ldots, n$ $$P_{\mu_k}^{(\tau)} = \left\{ i \in Q^{(\tau,0)} S_{j_1,i}^{(\tau)}, S_{j_2,o}^{(\tau)} \in \langle b_Q^{(\tau,0)} \rangle_H \text{ s.t.} \left\{ \begin{array}{l} \sigma^{(h^{(\tau,0)})}(j_1) = \varsigma_{k+1}^{(\tau)} \\ \sigma^{(h^{(\tau,0)})}(j_2) = \varsigma_{k+2}^{(\tau)} \end{array} \right. \right\} \tag{29}$$

Optimal Number of Votes: The number of selected players to be responsible for the construction of the secret key can exceed the threshold t+1. Hence, for all $k \in \{0, \ldots, n\}$:

$$|P_{\mu_k}^\tau| \geq t+1 \tag{30}$$

Lemma 5. The optimal number of votes that the players can make, so that the number of players that can send the shares to each user exceeds the threshold t, can be:

$$\left\lceil \frac{|Q^{(\tau,0)}| + t + 2}{2} \right\rceil \tag{31}$$

Proof: $v_k = \left\{ i \in Q^{(\tau,0)} : S_{j_1,i}^{(\tau)} \in \langle b_Q^{(\tau)} \rangle_H \text{ s.t.} \left\{ \sigma^{(h^{(\tau,0)})}(j) = \varsigma_{k+1}^{(\tau)} \right\} \right\}$ It can be observed that:

$$P_k^\tau = v_k \cap v_{k+1} \tag{32}$$

and, by exploiting the preimage property of Bloom filters, that:

$$V_j^{(\tau)} \cap Q^{(\tau,0)} \subset v_k \text{ with } \sigma^{(h^{(\tau,0)})}(j) = \varsigma_{k+1}^{(\tau)} \tag{33}$$

Thus:

$$V_j^{(\tau)} \cap V_{j'}^{(\tau)} \cap Q^{(\tau,0)} \subset v_k \cap v_{k+1} \text{ with } \begin{array}{l} \sigma^{(h^{(\tau,0)})}(j) = \varsigma_{k+1}^{(\tau)} \\ \sigma^{(h^{(\tau,0)})}(j') = \varsigma_{k+2}^{(\tau)} \end{array}. \tag{34}$$

Afterwards, for such numbers j and j' can be after simple arithmetic:

$$|P_k^\tau| = |v_k \cap v_{k+1}| \geq |(V_j^{(\tau)} \cap Q^{(\tau,0)}) \cap (V_{j'}^{(\tau)} \cap Q^{(\tau,0)})| \geq 2|V_j^{(\tau)}| - |Q^{(\tau,0)}|. \tag{35}$$

Because it can be shown that for any two subset A and B of a finite set C, s.t. $|A|=|B|$, it can be $|A \cap B| \geq 2|A| - |C|$. That can be because $|A \cap B| = |A| + |B| - |A \cup B| = 2|A| - |A \cup B| \geq 2|A| - |C|$, since $A \cup B \subset C$.

Afterwards $$2|V_j^{(\tau)}| - |Q^{(\tau,0)}| \geq t + 1 \Rightarrow |V_j^{(\tau)}| \geq \frac{|Q^{(\tau,0)}| + t + 1}{2} \tag{36}$$

the minimum number of votes that satisfies the inequality can be:

$$|V_j^{(\tau)}| = \frac{|Q^{(\tau,0)}| + t + 1}{2} \tag{37}$$

and this for all $j \in Q^{(\tau,0)}$, concluding the proof.

Local Shares Construction: $P_i$ constructs the local share of the session identified by $\tau$, denoted by $s_i^{(\tau,0)}$, by summing the received shares from the qualified players:

$$s_i^{(\tau,0)} = \sum_{j \in Q^{(\tau,0)}} s_{i,j}^{(\tau,0)} \tag{38}$$

$P_i$ can send to the end users $\{u_k\}_{k \in U_{P_i}^{(\tau)}}$ the share $s_i^{(\tau,0)}$.

Each user $\mu_k$ with $k=0, \ldots, n$ can reconstruct the secret key from the shares sent to it by the players in $P_{\mu_k}^{(\tau)}$.

$\mu_k$ receives the shares $\{s_i^{(\tau,0)}\}_{i \in P_{\mu_k}}$ $\mu_k$ verifies each share $s_i^{(\tau,0)}$ by checking:

$$g_i^{s^{(\tau,0)}} \bmod p = \Pi_{j \in Q(\tau,0)} \Pi_{i=0}^t (A_{i,j}^{(\tau,0)})^{j^i} \bmod p \tag{39}$$

This requires knowledge of the set of qualified players, which can be obtained either from publicly broadcast complaints during the verification of shares or simply obtained from trusted player(s) to minimize overhead on the end users.

$\mu_k$ constructs the symmetric key of the session t after selecting a subset $R \subset P^\tau$ of t+1 elements:

$$s_i^{(\tau,0)} = \sum_{i \in P^{(\tau)}} s_{i,j}^{(\tau,0)} \prod_{j \in P^{(\tau)} - \{i\}} \frac{j}{j-i} \bmod p. \tag{40}$$

Note that $s^{(\tau,0)}$ can also be optionally verified by checking whether $g^{s^{(\tau,0)}} \bmod p$ can be congruent to $h^{(\tau,0)}$, where $h^{(\tau,0)}$ can be obtained in the same manner as described in 4.5.

A significant feature of this protocol can be its capability to facilitate key recovery in case users lose their generated key. This feature eliminates the necessity for permanent storage of secret keys on the device, reducing the risk of key loss, especially when considering the physical storage of the device as a potential vulnerability.

If a user $\mu_k$ wants to recover the key $s^{(\tau)}$ it can perform the fallowing steps.

$\mu_k$ requests a neighboring/trusted player to recover the key specifying its identity $\text{Id}_{\mu_k}$ and the identifier of the key ($\tau$).

The player broadcasts the request to the other players.

Each player $P_i$ checks if k belongs to $U_{P_i}^{(\tau)}$, as well as the identity of the requester.

If $P_i$ can be responsible for $\mu_k$, then it can send to it the share $s^{(\tau)}$ through the secure communication channel.

$\mu_k$ can then receive the shares $\{s_i^{(\tau,0)}\}_{i \in P_{\mu_k}^{(\tau)}}$, verify them, and reconstruct the key;

$s^{(\tau)}$ as described in the key construction process.

Generation of Subsequent Secret Keys: In certain scenarios, the initial end user, or generally any user $\mu_k$ in the group that shares $s^{(\tau,0)}$, may request establishing additional shared secret keys with the same group of users during the ongoing communication session $\tau$. The decentralized end-to-end encryption protocol can introduce an advantageous feature in this context, simplifying and reducing the cost of generating subsequent keys $s^{(\tau,1)}, s^{(\tau,2)}, \ldots$ in comparison to the initial key $s^{(\tau,0)}$.

Specifically, the generation of the keys $s^{(\tau,1)}, s^{(\tau,2)}, \ldots$ does not require the selection of a new subset of responsible players for each user. Instead, the previous subset of players $P_{\mu_k}^{(\tau)}$ remains unchanged unless a user explicitly requests the creation of a new key for another session $\tau'$. As a result, this approach minimizes operational overhead, thereby reducing the need for activities such as voting, creation of the Bloom filters, and the corresponding transactions.

For this purpose, in response to a request for creating a key $s^{(\tau,q)}$, with q>0, the process goes as follows; let $P^\tau = U_{k=0}^{n} P_{\mu_k}^{(\tau)}$ denote the subset of players that were selected for $\tau$, i.e. during the generation of the first key.

Each player $P_i$ generates again t coefficients $a_{i,0}^{(\tau,q)}, \ldots, a_{i,t}^{(\tau,q)}$ to prepare a new polynomial $f_i^{(\tau,q)} = \Sigma_{k=0}^{t} a_{i,t}^{(\tau,q)} X^k$ to be publicly broadcast with the corresponding transaction $T_{P_i}((A_{i,0}^{(\tau,q)}, \ldots, A_{i,t}^{(\tau,q)}))$, and finally sends to each player $P_j$ through the secure communication channel the share $s_{j,0}^{(\tau,q)} = f_i^{(\tau,q)}(j) \mod p$.

$P_i$ checks the received shares using the public values, determines after the complaining phase the set of qualified players $Q^{(\tau,q)}$ and computes the local share $s_i^{(\tau,q)} = \tau_{j \in Q(\tau,q)} s_{i,j}^{(\tau,q)}$ and secretly sends to all the users in $U_{P_i}^{(\tau,q)}$.

Each user $\mu_k$ receives the shares:

$$\{s_i^{(\tau,q)}\}_{i \in P_{\mu_k}^\tau \cap Q^{(\tau,q)}} \quad (41)$$

The condition $|P_{\mu_k}^{(\tau)} \cap Q^{(\tau,q)}|$ can be satisfied to proceed the key construction. $\mu_k$ can finally construct the secret key $s^{(\tau)}$ based on received shares. The recovery of the key $s^{(\tau,0)}$ can be performed using the same process explained earlier.

The decentralized end-to-end encryption protocol can have three building blocks: i) the DF-VSS distributed key generation protocol, ii) The distributed ledger (Blockchain), and iii) the use of Bloom filters to select the subsets of players responsible for generating subsequent keys in a session t and sending the shares of the secret key to the corresponding users. The DF-VSS protocol can ensure that the cryptographic key shares can be verifiable by the nodes without revealing the actual shares to unauthorized parties.

The security of the used consensus mechanism to create the transactions, the security of solving the discrete logarithm problem, the security of the hash functions used in the insertion to the Bloom filters, i.e. the functions in the set $\mathbb{Z}$, and the function $\sigma^{(\cdot)}(\bullet)$ in term of their satisfaction of the requirements of Pseudorandom Function (PRF) can be assumed.

The protocol offers flexibility to be adapted to various use cases. The decentralized end-to-end encryption protocol can be applied in any context where the generation of a pair of public and private keys can be required, with the following advantages:

Decentralization: In contrast to systems that rely on a single entity to generate the key pair, the key generation process in the decentralized end-to-end encryption protocol can be done in a distributed manner, the public key can be safely and publicly exposed, but no entity can access to the private key, and a collaboration of at least a threshold t+1 of system entities can be required for its reconstruction.

Complete verifiability: This allows for the detection of any malicious activity during and after the process, ensuring the integrity of the generated keys through the use of Blockchain technology.

Key storage and distribution: Any public key $h^{(\tau,0)}$ and its corresponding identity to the entities requiring it can be publicly exposed and can be verified by any entity through the Blockchain transactions of the players on the publicly broadcast values from which it can be derived, i.e. the values $A_{i,0}^{(\tau,0)}$ to for any $i \in Q^{(\tau,0)}$.

Easy recovery of private keys: Owners can restore a lost private key by requesting it again.

The proposed protocol can be used to create secure communication channel between two users Alice and Bob. The following outlines the proposed system design.

The decentralized end-to-end encryption protocol can function as the key agreement protocol within the messaging system, enabling the creation of shared secret keys between Alice and Bob. These keys can not be employed directly for symmetrically encrypting the exchanged messages but can serve a crucial role in the Double Ratchet algorithm. This usage in the Double Ratchet algorithm provides a two-fold benefit in terms of security: forward secrecy and backward secrecy. The double ratchet algorithm can provide forward secrecy and cryptographic ratcheting, ensuring the security of message exchanges over time.

Forward secrecy ensures that past messages remain confidential even if current keys can be compromised. In other words, if an adversary succeeds to eavesdrop t+1 secure communication channels between Alice and the players responsible for it, and thus compromised a certain secret key $s^{(\tau,0)}$, the adversary can not be able, using that key, to decipher the past messages exchanged between Alice and Bob during the session t. With t in this context identifies the messaging session between these two users.

Backward secrecy guarantees that compromising future keys can not compromise the secrecy of past messages.

It can be the fact that there can be a mechanism to ensure that a user, e.g. Alice, can be the true owner of an identifier $\text{Id}_{Alice}$ by which it can be recognized by the players responsible for it, i.e. $P_\mu^{(\tau)}$ when they can send to it the shares to construct the future secret keys $s^{(\tau,0)}, s^{(\tau,1)}, \ldots$ through the secure communication channel they can build with her.

Furthermore, there can be the risk of an entity, like Charlie, impersonating Bob by falsely claiming to be the owner of the identifier $\text{Id}_{Bob}$. Consequently, when Alice requests the generation of keys for communication session t, she explicitly specifies that the keys, $s^{(\tau,0)}, s^{(\tau,1)}, \ldots$, can be generated for exchange with a user identified as $\text{Id}_{Bob}$. While the players can verify this through Blockchain transactions, there can be no guarantee that the key shares can be securely sent to Bob by the subset of players responsible for him. In this context, Charlie could potentially execute a man-in-the-middle attack.

To address the mentioned problems the following system design can be introduced.

User registration and identity binding. The communicating users can first create accounts in the system. During this process, each user $\mu$ can generate a pair of private/public cryptographic keys $sk_\mu$ and $pk_\mu$. These keys can typically be used for establishing secure communication channels between the user and the decentralized end-to-end encryption protocol players. To ensure trust and security, each user's public key $sk_\mu$ can be associated with a digital certificate. These certificates can be typically issued by trusted Certificate Authorities (CAs) and bind the user's public key to its identifier $Id_\mu$, providing authentication and preventing impersonation. This process can be often used in conjunction with the HTTPS protocol, and more specifically, TLS. When users connect to the system using HTTPS/TLS, their certificates can be checked to confirm the authenticity of the public keys, allowing for encrypted and authenticated communication between users and the system.

Rather than depending on a centralized Certificate Authority (CA), the association between $pk_\mu$ and $Id_\mu$ can be established via a smart contract involving the system's participants, and the confirmation of identity can be accomplished by examining the multi-signed transaction linked to user registration.

Key agreement. The key exchange for the subsequent steps can be facilitated using the decentralized end-to-end encryption protocol. When the initial user, like Alice, initiates the conversation, she sends a request to establish a shared symmetric encryption key with Bob. Utilizing symmetric encryption methods such as AES for message encryption can be particularly suitable for instant messaging, as it minimizes the computational overhead on the devices. In fact, the exchanged key can not be employed directly for encryption, it can instead be used within the context of the Double Ratchet algorithm.

Messages encryption, sending, and receiving: This process can be done using the Double Ratchet algorithm. The fundamental concept within this algorithm can be the KDF chain, defined as a cryptographic function that takes a secret, a random KDF key, and input data to produce an output that appears random, as long as the key remains confidential, satisfying the requirements of a cryptographic Pseudorandom Function.

In a Double Ratchet session involving Alice and Bob, each participant maintains three KDF keys: one for a root chain, one for a sending chain, and another for a receiving chain. Alice's sending chain corresponds to Bob's receiving chain, and vice versa. As messages can be exchanged, new decentralized end-to-end encryption protocol secret keys can be shared, and they can be used as inputs to the root chain. The output keys generated by the root chain then become fresh KDF keys for the sending and receiving chains. This process can be referred to as the decentralized end-to-end encryption protocol ratchet. The sending and receiving chains progress as messages can be transmitted and received, and the keys they produce can be employed for the encryption and decryption of messages. This process can be known as the symmetric-key ratchet.

Document Storage: A user can request the generation of a public/private key in order to encrypt and store a document in form of replicas among different players.

Most of the conventional cloud storage approaches rely on a central server that generates and/or shares encryption keys and sends them to the user in order to encrypt the document before sending it through a public network. However, nothing can prevent the centralized server to decipher the stored document and eavesdrop the client's data.

Some proposals, including, have tackled this issue by introducing a password-based technique known as SecretStore. The primary aim of SecretStore can be to prevent administrators from accessing users' stored data. The approach involves client-side encryption of the data before a second layer of encryption can be applied using the server's key, after which the document can be uploaded.

Client-side encryption in SecretStore can be carried out iteratively using a set of public keys, with the user determining the number of iterations based on their desired level of security. This approach also addresses the challenge of securely storing private keys for future decryption on the user's device. Since users cannot feasibly maintain their private keys indefinitely, as opposed to a server, various factors such as platform switches, device damage, or loss can impact key availability. To mitigate this, the authors propose a regenerative private key method, allowing private keys to be generated or regenerated using a user-provided password. In addition, the authors proposed a mechanism to strengthen the passwords.

Similarly, OpenEthereum's SecretStore can be an open-source platform for distributed elliptic curve key pair generation through a cryptographic protocol. SecretStore can ensure that the private key remains concealed from each participating party while the public key can be computed and shared safely. Each party holds a share of the private key, and a subset of at least t+1 parties can collaborate to reconstruct the private key, while a group of fewer than t+1 parties cannot. Additionally, the private key shares can be stored separately by many parties, and the system enforces threshold retrieval based on Blockchain permissions, necessitating the consensus of at least 1+1 parties for operations requiring the private key.

Additionally, SecretStore enables the storage of documents. Through the permissioning contract, a user can grant access to specified individuals for the documents stored on the platform. To achieve this, a pair of keys can be generated, with the public key being used to encrypt the document on the client's side. This encrypted document can then be uploaded, stored, and replicated across the system's nodes. Subsequently, other users can request the corresponding private key for decryption and access to the stored document.

Similar ideas can be adopted using the decentralized end-to-end encryption protocol. A user $\mu$ owning a document D can request generation of a pair of public key $h^{(\tau,0)}$ and secure key $s^{(\tau,0)}$, the identifier can serve here as an identifier for the document D. $\mu_0$ can specify itself as the owner of the key pair in the case of storing individually secret data. The user can request sharing these keys with other users $\mu_1, \ldots \mu_n$ by specifying their identifiers in the key generation request in the case of storing a shared document among them. The public key $h^{(\tau,0)}$ can be used to encrypt the document for more security by avoiding the local construction of the secret key in the device in spite of the fact that the decentralized end-to-end encryption protocol can be secure the adversary can corrupt all the secure communication channels between the user and the anonymous players responsible for it. Then D can be encrypted by any public-key discrete logarithm based cryptographic primitive like ElGamal, and upload the encrypted document to be distributively replicated among the decentralized end-to-end encryption protocol players. Afterwards, any user $\mu_0$, $\mu_1, \ldots, \mu_n$ can request getting the encrypted version of the document and the retrieval of the secret key $s^{(\tau,0)}$ to decipher it.

For future documents, if shared between the same users, a user among them (the owner of the new document) can request directly the construction of a key pair $h^{(\tau,1)}$ and $s^{(\tau,1)}$, which can be less costly to get to encrypt the new document. In some applications, the utilization of the private key $s^{(\tau,0)}$ for encrypting documents via a symmetric encryption method like AES can be advantageous, particularly on resource-constrained devices, due to its lower computational cost when compared to public-key cryptography. This approach can be well-suited for such devices where efficiency can be a priority.

Figure 5:
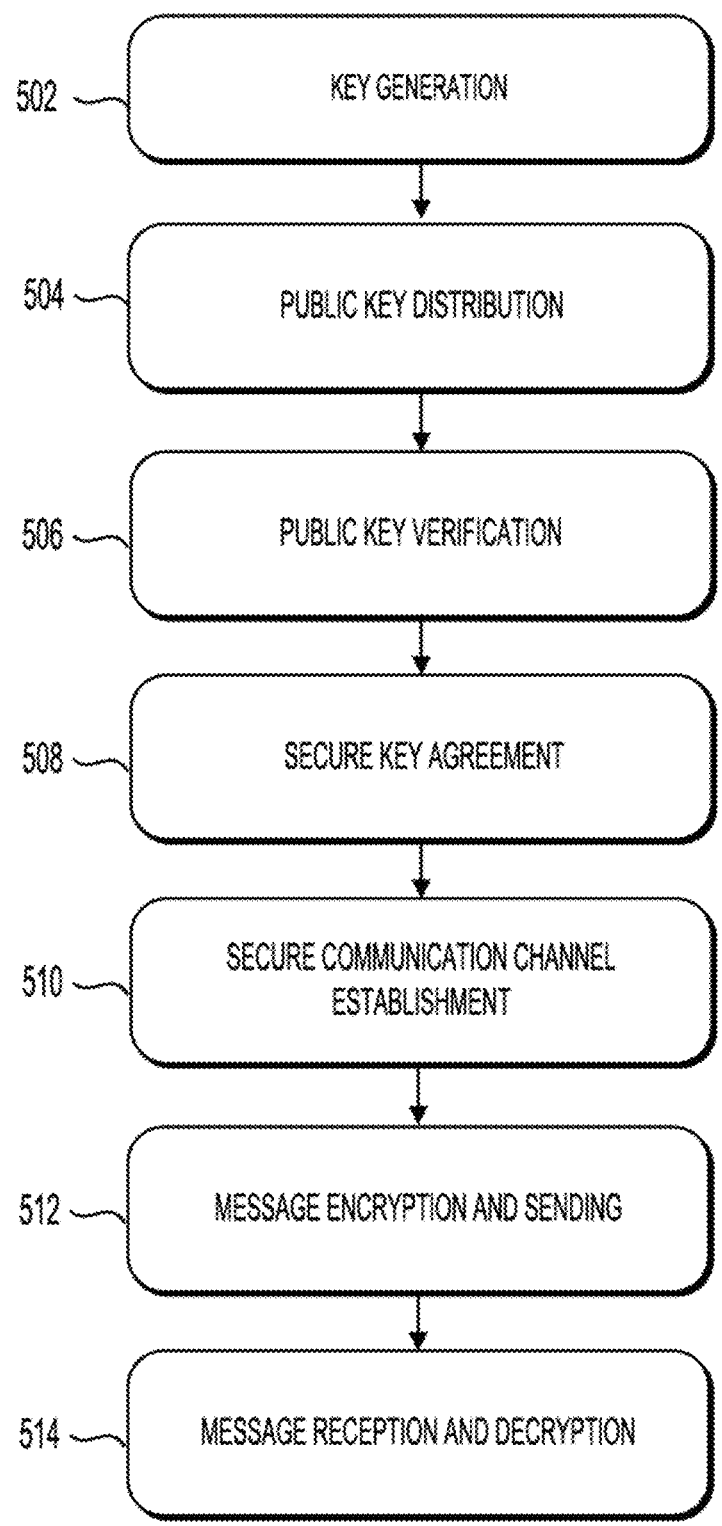
FIG. 5 illustrates a flow diagram of an example method for establishing secure decentralized end-to-end encryption in a distributed network, in accordance with an embodiment of the present disclosure.

FIG. 5 illustrates a flow diagram of an example method for establishing secure decentralized end-to-end encryption in a distributed network. The method 500 may be implemented using any one or more of the components and devices detailed herein in conjunction with FIGS. 1-4. In overview, the method 500 may be performed by a suite of network nodes, user devices, and supporting blockchain infrastructure within a distributed network environment, in some embodiments. The nodes within the network can include user devices and blockchain participants, among others, that collectively contribute to the secure exchange of cryptographic keys and subsequent communication. Additional, fewer, or different operations may be performed in the method 500 depending on the embodiment. At least one aspect of the operations is directed to a system, method, apparatus, or a computer-readable medium.

At STEP 502, the method can involve generating cryptographic keys where each user within the distributed network independently creates a key pair. This pair consists of a private key for the user's confidential use and a public key for sharing across the network. The generation of keys is a foundational step that underpins the security of the entire encryption process, ensuring that all subsequent operations are grounded on secure and unique cryptographic credentials for each participant.

At STEP 504, the method can include distributing the public keys using a blockchain network, wherein the public keys are broadcasted or registered on a decentralized ledger. This ensures that the keys are immutably and transparently recorded, providing a reliable reference for verifying user identities and facilitating secure interactions.

At STEP 506, the method can involve the verification of the distributed public keys through a blockchain-based verification process. This process may utilize smart contracts or consensus mechanisms to authenticate public keys, ensuring that each key is legitimately associated with the corresponding user, thereby preventing impersonation and ensuring secure key management.

At STEP 508, the method can engage a secure key agreement protocol, such as Diffie-Hellman or a similar blockchain-facilitated mechanism, enabling two or more parties to collaboratively generate a shared secret key. This step is critical for ensuring that the secret key is known only to the parties involved in the communication and remains confidential, despite the exchange potentially occurring over an unsecured channel.

At STEP 510, the method can establish secure channels for communication using the shared secret key agreed upon in the previous step. These channels can be used for the encrypted exchange of messages, safeguarding them against eavesdropping and unauthorized interception, thereby ensuring the privacy and confidentiality of the communication.

At STEP 512, the method can provide for the encryption and sending of messages, where users can encrypt messages with the shared secret key before transmission. This step can ensure that even if a message is intercepted, without the corresponding secret key, it would remain unintelligible to the interceptor.

At STEP 514, the method can enable the reception and decryption of encrypted messages. When a message is received, the recipient can use their copy of the shared secret key to decrypt the message, converting it back into its original, readable format. This completes the secure communication loop, allowing for private and secure information exchange within the distributed network.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. B $\mathcal{H}$ way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A system for facilitating secure communication between users within a blockchain network, comprising:
    a Multi-Signed Certificate Provider (MSCP) configured to generate and furnish multi-signed certificates for users' public keys, including an identity key, a one-time key comprising a key pair generated for single-use communication and associated with a timestamp and validity period, and a fingerprint key, and to register said certificates on the blockchain network;
    a blockchain network configured to store the multi-signed certificates;
    a smart contract deployed on the blockchain network, configured to manage the registration, retrieval, and verification of multi-signed certificates for establishing secure communication channels between users;
    an instant messaging server associated with the MSCP, configured to facilitate message delivery by notifying users of incoming messages and ensuring prompt relay of messages; and
    a user device equipped with a cryptographic module, configured to generate public and private keys for the secure communication channel established based on verified multi-signed certificates from the blockchain network,
    wherein the one-time key is used by the user device, upon retrieval of a corresponding one-time key certificate, to generate a shared master key for encrypting messages transmitted over the secure communication channel, and
    wherein the user device's cryptographic module is further configured to send registration requests to the MSCP over a secure connection, including user ID, public components of the keys, a timestamp, keys' validity, and signatures, and
    wherein the MSCP is further configured to invoke smart contract functions to add the multi-signed certificates to the blockchain network.

2. The system of claim 1, wherein the MSCP is further configured to:
    validate registration requests from users, including verifying signatures of the keys using the fingerprint key; and
    multi-sign the certificates using private keys of a predetermined number of nodes within the blockchain network.

3. The system of claim 1, wherein the smart contract is further configured to: provide functions for adding identity and one-time certificates to the blockchain network;
    facilitate the retrieval of multi-signed certificates by users, enabling the secure exchange of messages between them; and
    perform identity verification and mutual authentication by verifying the authenticity of certificates and public keys retrieved from the blockchain network.

4. The system of claim 1, wherein the user device's cryptographic module is further configured to:
    receive and validate the MSCP's response containing the multi-signed certificates and the MSCP's own certificate; and generate a shared master secret using the public keys retrieved from the blockchain network for encrypting and decrypting messages.

5. The system of claim 1, further comprising:

the user device configured to update the keys and certificates by configuring to send requests to the MSCP, wherein the MSCP configured to generate new multi-signed certificates and update the blockchain network.

6. The system of claim 1, wherein the MSCP is further configured to:

multi-sign new certificates using private keys of a rotating set of nodes within the blockchain network.

7. The system of claim 1, wherein the smart contract is further configured to:

log registration and retrieval events related to multi-signed certificates to provide an auditable record.

8. The system of claim 1, wherein the user device's cryptographic module is further configured to:

generate an identity key pair, a one-time key pair, and a fingerprint key pair;

sign the identity key and one-time key using the fingerprint key;

transmit a registration request to the MSCP, the registration request comprising the signed public keys, a user identifier, a timestamp, and a key validity period;

receive multi-signed certificates for the public keys from the MSCP over a secure channel; and validate the certificates using the MSCP's signature prior to storing the certificates locally.

\* \* \* \* \*